W. Brodhead,
Wood Auger.
Nº 49,336. Patented Aug. 8, 1865.
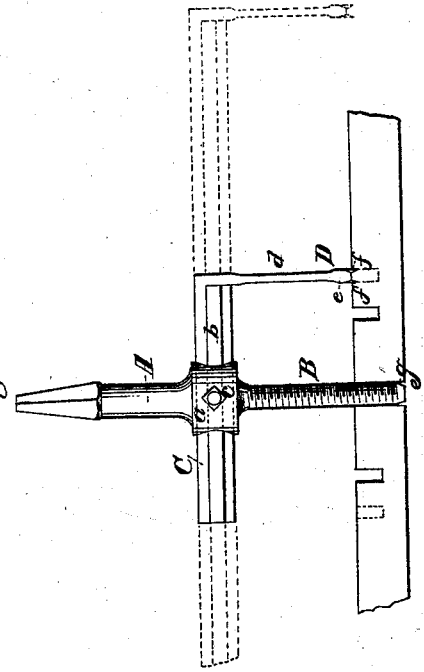
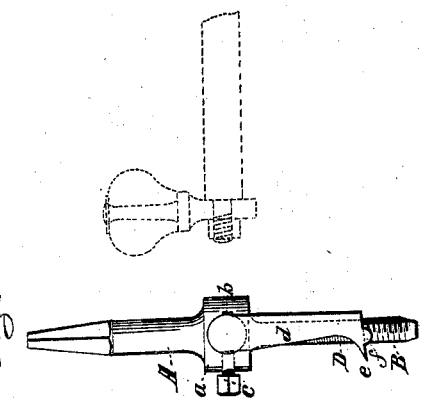
Witnesses
Theo Tusch
Wm. Breurin
Inventor
Wessel Broadhead
per Munn & Co
Attorneys

UNITED STATES PATENT OFFICE.

WESSEL BRODHEAD, OF RONDOUT, NEW YORK, ASSIGNOR TO C. L. EDMONDS, OF SAME PLACE.

IMPROVEMENT IN BORING-TOOL.

Specification forming part of Letters Patent No. 49,336, dated August 8, 1865.

*To all whom it may concern:*

Be it known that I, WESSEL BRODHEAD, of Rondout, in the county of Ulster and State of New York, have invented a new and Improved Boring-Tool; and I do hereby declare that the following is a full, clear, and exact description thereof, which will enable those skilled in the art to make and use the same, reference being had to the accompanying drawings, forming part of this specification, in which—

Figure 1 is an end view of my invention; Fig. 2, a side view of the same.

Similar letters of reference indicate corresponding parts.

This invention relates to a new and improved boring-tool for boring holes in wood for the purpose of facilitating the sawing of ornamental open-work, where holes are required to be bored to admit of the insertion of the saw, and where curves form a part of the configuration of the work.

The invention is also applicable to the boring of holes for any purpose, and it has for its object the ready adjustment of the cutter for the cutting of holes of various sizes and the obtaining of a great range of adjustment, so that quite small and quite large holes may be bored with one and the same tool.

A represents a shank, constructed similar to the shank of a bit, so that it may be secured in an ordinary carpenter's brace; and B is a screw connected with or formed on the same piece of metal with the shank, and in line with it, as shown clearly in Fig. 2.

At the lower end of the shank A, at its junction with the screw B, there is a head or hub, $a$, through which a bar, C, passes at right angles. The hole in the head or hub $a$ may be either round or square, the bar C of course corresponding in form. If a round hole and bar be used, as shown in Fig. 2, the latter has a longitudinal feather or rib, $b$, upon it, to fit in a recess adjoining the hole in the head or hub to prevent the bar from turning in the hole. The bar C is allowed to slide freely in the hole in the head $a$, and the bar may be secured to the head at any point within the range of its movement by means of a set-screw, $c$.

At one end of the bar C there is a cutter, D, which may be permanently attached or welded to the bar C, or made detached and adjusted thereto by a screw-nut or other means, to admit of different-sized cutters being applied to one and the same bar. The shank $d$ of this cutter is parallel with the screw B, as shown in Fig. 2, and the cutter is formed of a chisel, $e$; and two fleam-shaped lips, $ff$, are at each side of the chisel and projecting at right angles from it, as will be fully understood by referring to Figs. 1 and 2.

In using the implement a hole, $g$, is first bored in the wood, and the screw D fitted in said hole, and the implement turned by means of the brace, the bar C having been previously adjusted so that the cutter D will be at the proper distance from the screw to cut the hole of the desired size or diameter. In turning the implement the lips $ff$ cut two fine grooves in the wood, while the chisel $e$ takes out the wood between said cuts or grooves, as will be fully understood by referring to Fig. 2. The screw B feeds the cutter to its work, and the chisel, in consequence of being constructed as described, is allowed to perform its work with facility and in a perfect manner.

If considered preferable, the screw B may be provided with a bit and a center, so as to cut its own hole, like an auger; or the screw may be made like an ordinary screw-auger to effect that result; and in cases where quite large holes are to be bored a handle may be applied to the end of the bar C opposite to where the cutter is attached, as shown in red, Fig. 2, in order to facilitate the turning of the implement.

The device is extremely simple and may be constructed at a small cost, and will prove to be a great acquisition in cases where holes varying in size require to be bored.

I would remark that the bar C may be graduated into inches and the usual subdivisions thereof, in order to admit of the ready adjustment of the cutter to cut different-sized holes.

Having thus described my invention, I claim as new and desire to secure by Letters Patent—

The boring-tool herein described, consisting of a fine feeding screw, B, and arm C, sliding in the head of the said feeding-screw, and having permanently attached to it the shank $d$ of a cutter, D, formed with a chisel-point, $e$, a curved neck for the ejection of chips, and two fleam-shaped blades, $ff$, all the parts being constructed and arranged to operate as and for the purposes specified.

WESSEL BRODHEAD.

Witnesses:
O. G. DU BOIS,
MARTIN G. HAYES.